July 31, 1945.                J. C. CHRISTIAN ET AL                2,380,501
                                BORE SIGHTING APPARATUS
                                 Filed Feb. 24, 1942
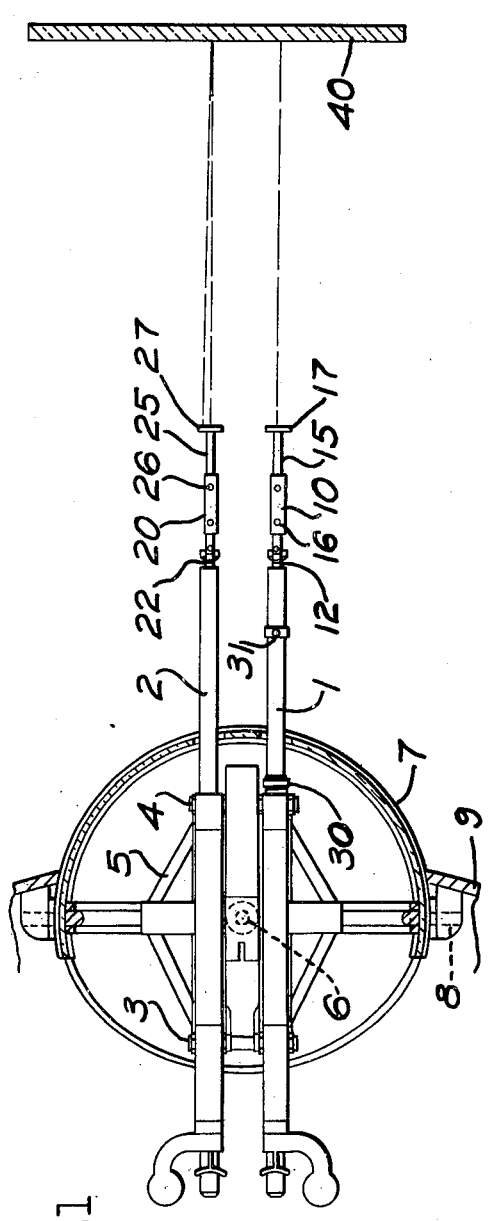
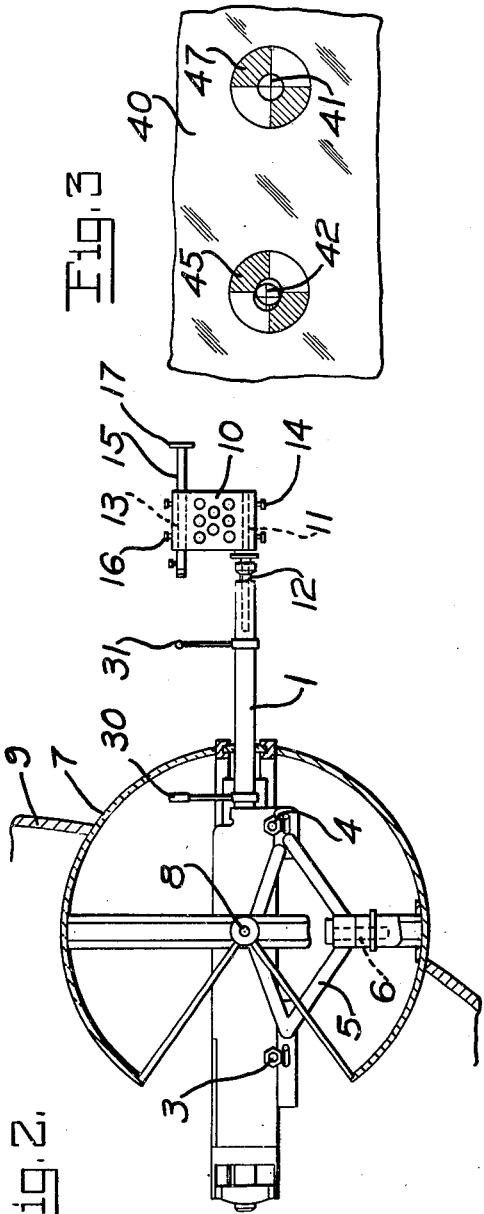
Inventors
JOHN C. CHRISTIAN
ROBERT T. SEYMOUR
By Reynolds & Beach
Attorneys Patented July 31, 1945

2,380,501

UNITED STATES PATENT OFFICE 2,380,501

BORE SIGHTING APPARATUS

John C. Christian and Robert T. Seymour, Seattle, Wash., assignors to Boeing Aircraft Company, Seattle, Wash., a corporation of Washington Application February 24, 1942, Serial No. 432,110

2 Claims. (Cl. 88—1)

In modern aircraft, particularly of types other than single-seat fighters, guns for protection are often mounted in movable mounts, frequently enclosed within a shell or eyeball, and usually two guns are carried upon a common mount, to fire upon the same target. Even though the range at which such guns are effective is relatively short, owing to the high speeds involved, it is all the more essential that these guns be precisely located, each with respect to the other, for once the target is in the gunner's sight, it is essential to bring to bear all available fire power, and this can not be done, even at the short ranges involved, if the guns' fire is scattered in any respect. In such dual mounts the two guns are usually required to be precisely parallel.

However, this is not an easy matter to accomplish. It has been the practice heretofore to mount the guns in the airplane, and then to take down the breech mechanism of each such gun, so that an observer might sight through the bore thereof upon a distant object, a mile or so away, and then, having centered such object in the bore of one gun, if he can center the same in the bore of the other gun, the two guns are assumed to be substantially parallel, and, for practical purposes, they may be.

One difficulty in following such a procedure is the undesirability of taking down and reassembling the breeches, and the time consumed in so doing. Moreover, in many cases, and particularly in the case of belly guns, the limitations of space and position make it quite difficult for an observer to peer through the bores at the distant object, the normal line of sight is appreciably above the bores, and it is difficult to bring the eye into line with the bores, and to level the bores on the object. It must also be remembered that such a procedure requires taking the airplane, with its guns mounted, out into the open, so that the guns can be sighted upon a target sufficiently distant; that such target must be a large and prominent object, such as a house or a public building, and hence can not be accurately centered in the bore, and that conditions of weather and visibility may make it difficult to accomplish the sighting in this way.

A like problem is encountered in properly coordinating the fire of several fixed guns, such as the wing-mounted guns of a fighter airplane, with each other and with the gunner's sights. The lines of fire of such guns, and the gunner's light of sight, are spaced apart, and should converge at a point within effective range, perhaps two or three hundred yards, so that heavy fire can be directed at a vulnerable point in the armor of an enemy airplane. Here, again, slight departure from accuracy at the gun's mount will scatter the fire, and render it largely ineffective at normal ranges.

While the problem is, in the one case, the disposition of two side-by-side guns in parallelism upon a common flexible mount or part of the aircraft structure, and in the other case the disposition of two or more widely spaced guns fixed upon the same aircraft structure so they converge upon the same target at a selected range, in effect the two problems are alike in that coordination of aim as between two or more guns carried upon the same aircraft structure must be obtained, without dependence upon the makeshift and only approximate methods heretofore used.

It is the aim, by the present invention, to provide an apparatus whereby such an operation, usually called bore-sighting, can be performed upon the paired guns or upon the several guns of an airplane or the like (a) without disassembling the breech, (b) without difficulty from the standpoint of space limitations within the airplane, (c) without the necessity of sighting upon a distant object, and hence capable of accomplishment within a hangar or shop, where little space is available, and (d) in a manner which is quicker, simpler, and considerably more accurate than the former method.

With these and other objects in mind, as will presently appear, our invention comprises the novel apparatus for use in bore-sighting paired guns, thus mounted, all as will be shown in the accompanying drawing and described herein, and the novel features of which will be defined in the claims which terminate this specification.

Figure 1 is a plan view, with part of the shield and support in section, illustrating our method of bore sighting such paired and flexibly mounted guns. Figure 2 is a side elevation of the same, again with parts of the shield and mounting in section.

Figure 3 is a diagram illustrating the mirrored images which will be observed by the operator when one gun has been properly sighted, and the other is somewhat off.

The drawings, Figures 1 and 2, illustrate a typical mount for two flexibly mounted, paired guns, though by no means the only type of mount to the adjustment of which our invention is suited. The guns are presented generally at 1 and 2. Each, at 3 and 4, is supported upon a mount generally indicated at 5, and in the arrangement shown this mount is swiveled upon an axis 6 to swing transversely with respect to an enclosing shell 7. This shell in turn is pivotally mounted upon an axis 8, to move with respect to the supporting aircraft structure 9. The customary arrangement, as between each gun and its immediate mount 5, is such that limited adjustment may be accomplished, but when such adjustment has been accomplished the gun is then capable of being fixed with relation to the common mount 5. Sighting means is provided for the paired guns, and a rear sight 30 and a front sight 31, mounted upon one gun, will suffice, provided the bores of the two guns are precisely parallel. It is the achievement of this parallelism which has been the difficulty heretofore.

To provide such parallelism, and to avoid the necessity of disassembling the breech mechanism for sighting through the respective bores, we provide an apparatus which in effect offsets the bores, by providing an optical system which can be mounted upon each gun with its optical axis precisely parallel to the bore of such gun. Thus a bracket 10 is provided with two parallel bores 11 and 13, spaced apart such a distance as might correspond, for instance, to the offsetting of the sighting axis of the sights 30, 31. This amount of offset, however, is merely for convenience, and is in no sense critical. Within the bore 11 is received a bore rod 12. This fits closely within the bore 11 of the bracket 10, being held therein by suitable means, such as the set screws 14, and it projects from the bracket at one end to enter the bore of one of the guns, as the gun 1. The bore rod 12 is of a size to fit precisely within the bore of the gun at its muzzle, and, of course, as such guns are provided in different sizes, different bore rods may be used for sighting different guns.

In the parallel bore 13 of the bracket 10 is received a telescope 15, defining a reference axis, and this may be suitably held in position, as by the set screws 16. About its objective is fitted a target 17 in the form of a flat ring, the center of which lies in the optical axis of this system. Preferably the telescope 15 is fitted with cross hairs, capable of cooperating with cross lines dividing the target 17 into four quadrant arcs, of which two opposite arcs may be shaded, as shown on their reflections in Fig. 3.

This bracket 10, it will be understood, can be rotated around the axis of the gun's bore to any convenient position for sighting through the telescope 15. A similar bracket 20, with like parallel bores, bore rod 22, telescope 25 defining a gun sighting axis, set screws 26, and target 27, similar to target 17, is mounted in the same relation as the bracket 10, with its associated parts, except that it is mounted upon the second gun 2.

With the guns mounted upon the mount 5, and with the brackets 10 and 20 mounted upon the respective guns, the first gun is pointed directly at a plane surface, which in this instance is a mirror 40. Assuming the gun 1 is first to be correctly disposed with relation to the mirror 40, the observer looks through the telescope 15, and observes the reflection of the target 17 in the mirror, identified by its circular outline and its alternate shaded and unshaded quadrant arcs. This reflection he sees at 47, and if the cross hairs 41 of the telescope 15 are centered in the reflection 47 of the target 17, the observer knows that the optical reference axis of the telescope 15 is precisely perpendicular to the mirror 40, and if this is true, then the bore of the gun 1, which is parallel to the reference axis, must also be perpendicular to the mirror 40. This end is normally accomplished by movement of the gun mount 4 and of the enclosure 7, without adjustment of this gun relative to the mount 5, which carries both gun 1 and gun 2. This result having been accomplished, pains are taken to fix parts of the mount and shell in this position.

The observer now goes to the telescope 25, and, along the gun sighting axis which it defines, observes the reflection of its target 27 in the mirror, and this he may see at 45. Simultaneously he observes the cross hairs 42 of this second optical system. Normally the two guns will not be set up in precise parallelism, therefore the telescope 25, and gun 2 parallel to it, will not be exactly perpendicular to mirror 40 when telescope 25 is. Consequently cross hairs 42 will not be centered with respect to the target reflection 45, but may appear superimposed upon target 27 eccentrically, as shown, by way of example, in Figure 3. In such instance the line of sight past the crosshairs to the mirror 40 and back to the target 27 will be along a broken line such as shown in Fig. 1. This shows the gun 2 is off both in azimuth and in elevation, relative to mirror 40, and hence with relation to the gun 1, which is fixed perpendicular to the mirror. Holding the common mount 5 fixed in position, the gun 2 and telescope 25 are then adjusted conjointly with respect to the mount, and therefore relative to the reference axis defined by telescope 15, for instance at 3 and 4, in such manner as to bring the gun sighting axis, typified by the telescope 25, into a position precisely perpendicular to the mirror 40, that is, to center the cross hairs 42 with respect to the reflection 45 of the target 27. When this has been done, assuming no movement of the gun 1, the gun sighting axis of the second optical system, hence of the second gun, is precisely perpendicular to the mirror 40, and since both guns are perpendicular to the mirror they are of necessity parallel to each other, in azimuth and in elevation, and throughout their range will fire upon the same target. Furthermore, the spacing of the points at which the lines of sight of the telescopes meet the mirror will necessarily equal the spacing of the telescope axes.

In the above description it has been assumed that the guns are mounted in the airplane, and that their immediate mount is normally movable with respect to the aircraft itself, in azimuth and elevation, but is fixed relative to the aircraft itself during the bore-sighting operation. Such procedure can be followed, and will produce extreme accuracy. Comparable accuracy can be obtained, and manufacturing methods can be greatly speeded up, if during the bore-sighting operation the guns are merely mounted in the turret, or upon their mount ring—in other words, upon an immediate support which later is to be fixedly or movably mounted upon the aircraft itself. So mounted, the guns are brought into the desired relationship, each to the other, and the mount ring or other immediate support, with the guns already in place and bore-sighted, is mounted within the airplane.

It must be remembered, too, that the sight for such guns is along a line not parallel to the guns' barrels, but converging therewith at the optimum effective range. If this range is short, such convergence must be allowed for in sighting the sights, and can be done by calculation of angles, or by any other suitable method.

What we claim as our invention is:

1. Apparatus for bore-sighting paired guns, comprising supporting means operable to maintain the guns in definite relationship to each other, means operable to adjust at least one of the guns relative to said supporting means, two sighting means, means operable to support said sighting means with their optical axes in definite, known relationship to the axes of the respective guns, a plane mirror positioned for disposition precisely perpendicular to the optical axes of both of said sighting means by adjustment of said adjusting means and of an extent great enough to be viewed simultaneously through both of said sighting means when thus positioned by said supporting means, and targets upon each such sighting means in similar relationship thereto, visible through the respective sighting means in identical relationship to the optical axes thereof by reflection in the mirror upon disposition of both of said sighting means perpendicular thereto.

2. Apparatus for bore-sighting paired guns, comprising supporting means operable to maintain the guns in definite relationship to each other, means operable to adjust at least one of the guns relative to said supporting means, two sighting devices, two brackets, each carrying one of said sighting devices, each having a bore rod closely fitting within the bore of its respective gun, and operable to support its sighting device with its optical axis in parallelism to the bore of its respective gun, a plane mirror positioned for disposition precisely perpendicular to the optical axes of both of said sighting devices by adjustment of said adjusting means and of an extent great enough to be viewed simultaneously through both of said sighting devices when thus positioned by said brackets, and targets upon and coaxial with each such sighting device, visible through the same in identical relationship to the optical axes thereof by reflection in the mirror upon disposition of both of said sighting means perpendicular thereto.

JOHN C. CHRISTIAN.
ROBERT T. SEYMOUR.